US007923500B2

(12) United States Patent
Siegel et al.

(10) Patent No.: US 7,923,500 B2
(45) Date of Patent: Apr. 12, 2011

(54) NANOCOMPOSITES WITH CONTROLLED ELECTRICAL PROPERTIES (75) Inventors: Richard W. Siegel, Menands, NY (US);
Linda Schadler-Feist, Niskayuna, NY (US); Dongling Ma, Ottawa (CA);
Jung-Il Hong, San Diego, CA (US); Eva Martensson, Vasteras (SE); Carina Onneby, Vasteras (SE)

(73) Assignee: Rensselaer Polytechnic Institute, Troy, NY (US)

( * ) Notice: Subject to any disclaimer, the term of this patent is extended or adjusted under 35 U.S.C. 154(b) by 877 days.

(21) Appl. No.: 10/568,829

(22) PCT Filed: Aug. 20, 2004

(86) PCT No.: PCT/US2004/027122
§ 371 (c)(1),
(2), (4) Date: Oct. 26, 2006

(87) PCT Pub. No.: WO2005/036563
PCT Pub. Date: Apr. 21, 2005

(65) Prior Publication Data
US 2007/0199729 A1 Aug. 30, 2007

Related U.S. Application Data (60) Provisional application No. 60/496,777, filed on Aug. 21, 2003.

(51) Int. Cl.
*C08K 3/18* (2006.01)
(52) U.S. Cl. ........................................ 524/431; 524/430
(58) Field of Classification Search .................... 524/431
See application file for complete search history.

(56) References Cited

U.S. PATENT DOCUMENTS

| 6,228,904 B1 | 5/2001 | Yadav et al. |
| 6,417,265 B1 * | 7/2002 | Foulger .......................... 524/495 |
| 6,667,368 B1 | 12/2003 | Brennan et al. |
| 2002/0070428 A1 * | 6/2002 | Bernhoff et al. .............. 257/618 |
| 2005/0027040 A1 * | 2/2005 | Nelson et al. ................. 523/216 |
| 2006/0145119 A1 | 7/2006 | Onneby |

FOREIGN PATENT DOCUMENTS

| CN | 1188779 | 7/1998 |
| DE | 4037972 | 6/1991 |
| EP | 1 033 724 A1 | 9/2000 |
| JP | 10116702 A | 5/1998 |
| WO | WO 00/52712 | 9/2000 |
| WO | WO 02/096982 | 12/2002 |
| WO | WO 2004/034409 | 4/2004 |
| WO | WO 2004/038375 | 5/2004 |

OTHER PUBLICATIONS

Onneby et al., "Electrical Properties of Field Grading Materials Influenced by the Silicon Carbide Grain Size," *IEEE*, pp. 43-45 (2001).
Martensson et al., "Electrical Properties of Field Grading Materials with Silicon Carbide and Carbon Black," *IEEE*, pp. 548-552 (1998).
ISA and Written Opinion of the International Searching Authority of International application No. PCT/US2004/027122.
Office Action dated Jan. 7, 2009 from U.S. Appl. No. 10/531,998.
Office Action dated Jul. 8, 2009 from U.S. Appl. No. 10/531,998.
Office Action dated Dec. 23, 2009 from U.S. Appl. No. 10/531,998.

* cited by examiner

*Primary Examiner* — Ling-Siu Choi
*Assistant Examiner* — Hui Chin
(74) *Attorney, Agent, or Firm* — Heslin Rothenberg Farley & Mesiti, P.C.

(57) ABSTRACT

A field grading material includes a field grading effective amount of a nanoparticle filler distributed in a polymeric matrix, and the nanoparticle filler is heterogeneously distributed in the polymeric matrix.

16 Claims, 2 Drawing Sheets

FIG. 4

NANOCOMPOSITES WITH CONTROLLED ELECTRICAL PROPERTIES

CROSS REFERENCE TO RELATED APPLICATIONS

This application is a 35 U.S.C. §731 U.S. national stage filing from PCT Application Ser. No. PCT/US04/27122 having international filing date of Aug. 20, 2004, published in English under WO 2005/036563 A3 on Apr. 21, 2001. US04/27122 claims priority from U.S. Provisional Application Ser. No. 60/496,777, filed Aug. 21, 2003. All are incorporated herein by reference in their entirety.

BACKGROUND OF THE INVENTION

At the transition of an electric field from a first medium to a second medium, electric stresses harmful to the electric equipment can ensue due to a discontinuity in the electric field. In a shielded high-voltage cable for instance, the electric field is uniform along the cable axis and there is variation in the field only in the radial direction. When the cable is terminated or spliced, the shield of the cable is removed for a distance along the cable. The removal of the shield causes a discontinuity in the electric field at the shield end, resulting in high electric stresses. These high stresses must be reduced in order not to impair the expected life of the system.

The electric stresses in question can be reduced by grading the electric field at the transition of the electric field from the first medium to the second medium, e.g. from a shielded cable part to a cable part where the original shield has been removed. A number of methods have been developed and employed for this kind of field grading. The present invention is related to so called resistive and capacitive field grading.

The resistive field grading can be used in alternating current as well as direct current applications. Resistive field grading can also be used in order to achieve field grading when voltages are occurring in the form of impulses. In case of a cable ending of the kind indicated above, a body having a suitable resistance is introduced around the unshielded part of the cable in the area closest to the shielded part of the cable and in electric contact with the shield. When a positive voltage is applied across the cable a current flows through the body towards the shield of the cable, which shield is at earth potential. A resistive voltage drop then occurs in the body, which results in a more uniform distribution of the potential. This potential distribution will be more linear if the body consists of a material exhibiting a non-linear electrical resistance that decreases with an increasing electric field. The closer to the edge of the shield, the higher the electric field in the field grading body and, consequently, the lower the electrical resistance in the body if the body exhibits such a non-linear electrical resistance. In this way, the voltage drop along the field grading body will become more uniformly distributed in a body that exhibits such a non-linear electrical resistance than in a body that does not.

The capacitive field grading is used in alternating current applications. Capacitive field grading can also be used in order to achieve field grading when voltages are occurring in the form of impulses. In case of a cable ending of the kind indicated above, a body of a material having a dielectric constant higher than that of the insulation and as low losses as possible is introduced around the unshielded part of the cable in the area closest to the shielded part of the cable and in electric contact with the shield, whereby a spreading of the equipotential lines will be achieved. Capacitive field grading properties are also desired in a material adapted for grading the electric field in high-voltage direct current applications so as to achieve an effective field grading in case of suddenly occurring voltage surges.

Polymers play an important role in electrical insulating and field grading technology because of their high electrical strength, ease of fabrication, low cost and simple maintenance. Conventionally, additives have been mixed into polymer matrices to improve their resistance to degradation, to modify mechanical and thermomechanical properties, and to improve electrical properties such as high-field stability. One limitation of conventional additives is the negative effect they can have on electrical properties. In the ideal case, an additive will both modify the property of interest and improve other properties, or at least not degrade the other properties. Nanocomposite structures composed of nanostructured fillers homogeneously or heterogeneously mixed with a polymer matrix are described in U.S. Pat. No. 6,228,904. Crosslinked conducting polymer composites including a major phase and a minor phase containing conducting filler such as carbon black, graphite, metallic particles, conducting polymers, carbon fiber, fullerenes, and/or carbon nanotubes dispersed in a semicrystalline polymer are disclosed in U.S. Pat. No. 6,417,265. Neither of the above patents mention field grading or insulating applications. WO 2004/038735 describes a field grading material consisting of a polymeric matrix containing a nanoparticle filler, and devices utilizing such materials. Neither surface treatment nor non-uniform distribution of the particles is mentioned. JP 11086634 relates to an insulating material wherein micron-sized magnesium oxide particles were surface treated with vinylsilane and mixed with ethylene homopolymers or copolymers. WO 2004/034409 discloses a nanometric composite including a stoichiometric nanoparticulate filler embedded in a polymer matrix with enhanced electric strength and improved voltage endurance properties. Non-uniform distribution of the filler is not described. However, there remains a continuing need for polymer composites having an enhanced balance of properties, particularly for use in these technology areas.

SUMMARY OF THE INVENTION

It has been unexpectedly discovered that semiconducting or dielectric nanoparticles heterogeneously distributed within a polymeric matrix can improve dielectric properties, resistivity, permittivity and/or electrical breakdown strength as well as mechanical properties of composite materials used as capacitive or resistive field grading materials, or as insulating materials. Semiconducting materials have an energy bandgap ranging from 0 eV to 5 eV and dielectric materials have a bulk dielectric constant at infinitely high frequencies of at least 5. The present invention also relates to a field grading or insulating material comprising a nanoparticle filler homogenously or heterogeneously distributed in a polymeric matrix, wherein the surface of the nanoparticle filler is modified by treatment with a organosilane or organotitanate compound and the organosilane compound comprises an organic group selected from alkyl, alkylamino, amino and carboxy. The organic group is preferably methyl, decyl, octyl, vinyl, aminopropyl or acetoxy.

DETAILED DESCRIPTION OF THE INVENTION

The present invention relates to polymer nanocomposites containing a nanoparticle filler distributed in a polymeric matrix, where the nanoparticle filler is heterogeneously distributed in the polymeric matrix. The nanocomposites are used as field grading materials or insulating materials. The nanoparticle filler may be a semiconducting material or a dielectric material; semiconducting materials have an energy bandgap ranging from 0 eV to 5 eV and dielectric materials have a bulk dielectric constant at infinitely high frequencies of at least 5. Nanoparticles used in the present invention are crystalline materials, and are referred to as nanocrystalline. Each nanocrystalline particle is composed of a single grain, that is, a single crystal consisting of atoms arranged in an orderly pattern. Nanocrystalline materials have grains containing thousands to tens-of thousands of atoms as compared to millions or trillions of atoms in the grains of conventional particles, and have a significantly higher percentage of atoms present on the surface of the particle.

Nanoparticles for use in the polymer nanocomposites of the present invention are composed of metal oxides, mixed metal oxides, silicon carbide or silica. Semiconducting carbon nanotubes may also be used; semiconducting carbon nanotubes are distinguished from conducting carbon nanotubes. Metal oxides include aluminum oxide, antimony tin oxide, cerium oxide, copper oxide, indium oxide, indium tin oxide, iron oxide, tin oxide, titanium dioxide, yttrium oxide, zinc oxide, barium oxide, calcium oxide, chromium oxide, magnesium oxide, manganese oxide, molybdenum oxide, neodymium oxide, and strontium oxide. (For the purposes of the present invention, silicon is considered a semiconductor, not a metal.) Metal titanate and metal silicate nanoparticles including, for example, strontium titanate, barium titanate, barium strontium titanate, and zirconium silicate may also be used. In particular, zinc oxide or silicon carbide nanoparticles may be used as resistive field grading materials. Aluminum oxide, titanium dioxide or barium titanate may be used as capacitive field grading materials. Other preferred nanoparticles include SnO, InO, CeO, $TiO_2$, $BaTiO_3$, $Al_2O_3$, $SiO_2$ and mixtures thereof. Choice of nanoparticle is governed by properties that are required in a particular application.

The polymeric matrix of a polymer nanocomposite according to the present invention includes rubbers, thermoplastic polymers, thermosetting polymers or thermoplastic elastomers. It is preferred that the matrix includes polyolefin rubber or thermoplastic polyolefin elastomer/plastomer, preferably including ethylene propylene diene monomer (EPDM) rubber or silicone rubber, or of crystalline thermoplastics, preferably polyethylene. In some embodiments, the polymeric matrix of a polymer nanocomposite according to the present invention consists, or at least essentially consists, of rubbers, thermoplastic polymers, thermosetting polymers or thermoplastic elastomers. It is preferred that the matrix consists, or at least essentially consists, of polyolefin rubber or thermoplastic polyolefin elastomer/plastomer, preferably including ethylene propylene diene monomer (EPDM) rubber or silicone rubber, or of crystalline thermoplastics, preferably polyethylene. A variety of diluents and additives which are well known to those skilled in the art may be admixed with the polymer resins including water, oils, coupling agents, crosslinking agents, diluents, pigments and dispersants.

Other polymers that may be used as the polymeric matrix include epoxy, polycarbonate, silicone, polyester, polyether, polyolefin, synthetic rubber, polyurethane, nylon, polyvinylaromatic, acrylic, polyamide, polyimide, phenolic, polyvinylhalide, polyphenylene oxide, and polyketone resins, homopolymers and copolymers and blends thereof. Copolymers include both random and block copolymers. Polyolefin resins include polybutylene, polypropylene and polyethylene, such as low density polyethylene (LDPE), medium density polyethylene (MDPE), high density polyethylene (HDPE), and ethylene copolymers; polyvinylhalide resins include polyvinyl chloride polymers and copolymers and polyvinylidene chloride polymers and copolymers, fluoropolymers; polyvinylaromatic resins include polystyrene polymers and copolymers and poly α-methylstyrene polymers and copolymers; acrylate resins include polymers and copolymers of acrylate and methacrylate esters, polyamide resins include nylon 6, nylon 11, and nylon 12, as well as polyamide copolymers and blends thereof; polyester resins include polyalkylene terephthalates, such as polyethylene terephthalate and polybutylene terephthalate, as well as polyester copolymers; synthetic rubbers include styrene-butadiene and acrylonitrile-butadiene-styrene copolymers and; polyketones include polyetherketones and polyetheretherketones.

The nanoparticles are suitably dispersed in the polymeric matrix by ordinary melt-mixing. However, changes in the properties of the composites caused by the introduction of nanoparticle fillers may be strongly controlled by the dispersion state of the filler particles in the polymeric matrix. Achieving a good dispersion of the fillers has been one of the major issues in the processing of polymer nanocomposites. Agglomeration frequently leads to loss of some improvements in properties attained by employing nanoparticles as fillers. While good dispersion is critical, it is not always apparent that the distribution of fillers needs to be uniform throughout the matrix for the best results. Well dispersed, but non-uniformly distributed, filler particles may lead to optimized properties. It should be noted that the nanocomposites according to the present invention contain well-dispersed nanoparticles, although not necessarily uniformly-dispersed, and are essentially free of agglomerated and/or aggregated particles. In the context of the present invention, "agglomerated" means that some individual particles adhere to neighboring particles, primarily by electrostatic forces, and "aggregated" means that some individual particles are chemically bonded to neighboring particles. It is possible to achieve improved electrical properties by means of an inhomogeneous, heterogeneous or non-uniform filler distribution.

Non-uniform distribution of the filler in the matrix may be achieved by mixing the nanoparticles with micron-size polymer powders. Particle size of the polymer particles is typically at least 1000 times greater than the particle size of the nanoparticle filler, preferably at least 100 times greater than the particle size of the nanoparticle filler, and most preferably at least 10 times greater than the particle size of the nanoparticle filler. For example, a mixture of nanoparticles and solid polymer in particulate form may be ball milled so that the nanoparticles become embedded in the soft surface of the polymer particles. The mixture may then be heated to melt the solid polymer and form the heterogeneous distribution. Typically, the particles remain at the interstices. The distribution may be varied by varying the particle size of the solid polymer.

Alternately, a heterogeneous distribution may be achieved by blending immiscible polymers to result in multiple phases as the nanoparticles are heterogeneously distributed within the polymers. The phases are typically co-continuous with the nanoparticles in the one of the phases or at the interface. When one of the polymers is a semicrystalline polymer having a relatively high crystallinity, the nanoparticles may concentrate in amorphous regions of that polymer or at the interface between it and other phases. The selection of materials should be such that favorable phase morphology, that is phase separation, develops between the phases. Phase separation may develop when the polymers selected for the composite material are such that the phases do not engage in interactions that promote miscibility, thus resulting in a negative enthalpy of mixing. Examples of polymer pairs that form multiple phases include polyethylene/EPDM, LDPE/HDPE, and maleic anhydride-modified EPDM/EPDM.

In one aspect of the invention, polymer nanocomposites according to the present invention may be used as field grading materials. Important properties associated with field grading materials include electrical resistivity, percolation limit, electrical breakdown strength, and complex dielectric constant (permittivity). The amount of nanoparticles that is effective for field grading applications ("field grading effective amount") is typically less than about 40% by volume, preferably less than about 30% by volume, and more preferably, less than about 20% by volume. For ZnO, for example, less than about 40% by volume is equivalent to less than about 80% by weight. The nanocomposites may also be used as insulating materials. The amount of nanoparticles that is effective for insulating applications ('insulating effective amount') is typically less than about 20% by volume, preferably less than about 10% by volume, and more preferably, less than about 5% by volume; for metal oxide particles, this is typically less than about 5% by weight. Nanoparticles for use in such nanocomposites include those above, in addition to carbon black. Titanium dioxide is a preferred material for use in insulating materials.

Where the polymer nanocomposites are used as a resistive field grading material, they include a filler composed of a semiconducting material, i.e., a material having an energy bandgap larger than 0 eV and smaller than about 5 eV, preferably ZnO or SiC. The use of semiconducting filler materials, such as ZnO or SiC, normally results in a non-linear electrical resistance of the field grading material, i.e., a resistance that decreases with an increasing electric field. This non-linearity of the resistance can be favorable in certain applications as previously indicated. The onset of the non-linearity of the resistance, i.e., the electrical field strength at which the resistance changes from an essentially linear to an essentially non-linear behavior, increases with decreasing size of the particles in the filler. Thus, a material according to this variant of the invention exhibits an onset of the non-linearity of the resistance being at a higher field strength as compared to a corresponding material comprising a filler consisting of particles of larger size. When the onset of the non-linearity of the resistance is at a higher field strength, reliable resistive field grading at high electrical fields becomes possible. This may be combined with suitable capacitive field grading properties.

Where polymer nanocomposites are used as a capacitive field grading material, the filler is composed of a material where the bulk has a dielectric constant at infinitely high frequencies of at least 5, preferably aluminum dioxide, titanium dioxide or barium titanate. This implies that the field grading material has effective capacitive field grading properties in possible combination with resistive field grading properties. It is known that the dielectric constant of a material consisting of a polymeric matrix with filler is fairly independent of the size of the high dielectric constant particles of the filler. However, it has surprisingly been found that there is a dramatic increase in the dielectric constant when the size of the particles in the filler is decreased to such an extent that the particles have at least one dimension smaller than or equal to 100 nm. Therefore, by decreasing the size of the high dielectric constant particles in the filler to such an extent that the particles have at least one dimension smaller than or equal to 100 nm, a field grading material having a desired dielectric constant can be obtained with a filler concentration being essentially lower as compared to a corresponding material comprising a filler consisting of particles of larger size.

In another aspect of the invention, the surface of a nanoparticle filler is modified by treatment with a coupling agent such as an organosilane or organotitanate compound prior to preparing the nanocomposite. The surface modified nanoparticles may be homogeneously or heterogeneously distributed in the polymeric matrix. Coupling agents are chemical substances capable of reacting with both the reinforcement and the resin matrix of a composite material, and may also bond inorganic fillers or fibers to organic resins to form or promote a stronger bond at the interface. The coupling agents may be applied from a solution or the gas phase to the reinforcement, added to the resin, or both. The coupling agent acts as interface between the polymeric matrix and the nanoparticle filler to form a chemical bridge between the two. Examples include organotrialkoxysilanes, titanates, and zirconates. Silane coupling agents are silanes of the formula $Si_nH_{2n+2}$ and other monomeric silicon compounds having the ability to bond inorganic materials such as nanoparticle fillers to organic resins. The adhesion mechanism is due to two groups in the silane structure, a hydrolyzable group, usually an alkoxy or chloro group and an organofunctional group. The $Si(OR_3)$ portion reacts with the inorganic reinforcement, while the organofunctional (vinyl-, amino-, epoxy-, etc.) group reacts with the resin. The coupling agent may be applied to the inorganic materials as a pre-treatment and/or added to the polymer or resin. Titanate and zirconate couplers are a family of alkoxy titanates and zirconates that typically have one to three pendant organic functional groups. The titanate couplers may also act as plasticizers to enable much higher loadings and/or to achieve better flow.

Organosilane compounds useful for modifying the surface of nanoparticles in the nanocomposites of the present invention have the formula $R_nSiR^1_{(4-n)}$ and contain n hydrolyzable R groups, where n is 1-3, which are usually chloro or alkoxy groups; $R^1$ may be alkyl, alkylamino, aryl, amino epoxy, acetoxy, mercapto, halo, cyano, hydroxy or carboxy. Preferably the organic groups are methyl, decyl, octyl, vinyl, aminopropyl and/or acetoxy. For hydrophobic polymers, such as polyethylene, for example, non-polar alkyl groups having at least ten carbons, may yield improved properties. For hydrophilic polymers, such as epoxy resins, $R^1$ may preferably contain polar functional groups such as amino or epoxy groups. Examples of hydrophobic silanes that may be used include n-decyltrichlorosilane, n-decyltriethoxysilane, dodecyltrichlorosilane, dodecyltriethoxysilane, hexadecyltrimethoxy silane, n-octadecylmethoxydichlorosilane, n-octadecyltrimethoxysilane, and undecyltrichlorosilane. Examples of silanes containing organofunctional groups include n-(2-aminoethyl)-3-aminopropyltriethoxysilane, n-(2-aminoethyl)-3-aminopropyltrimethoxy silane, 3-aminopropyltrimethoxysilane, 3-aminopropyltriethoxysilane, methacryloxypropyl-trimethoxysilane, methacryloxymethyltriethoxysilane, acetoxyethyltrimethoxysilane, (3-acryloxypropyl)trimethoxysilane, 5,6-epoxyhexyltriethoxysilane, (3-glycidoxypropyl)triethoxy silane, (3-glycidoxypropyl)trimethoxysilane, 3-mercaptopropyltrimethoxysilane, 3-mercapto-propyltriethoxysilane, 2-cyanoethyltrimethoxysilane, (3-cyanoisobutyl)-trichlorosilane, 3-chloropropyltrichlorosilane, 3-chloropropyltriethoxysilane, vinyltrimethoxysilane, vinyltrichlorosilane, vinyltriethoxysilane, allyltrichlorosilane, allyltriethoxysilane, and n-(3-acryloxy-2-hydroxypropyl)-3-aminopropyltriethoxysilane.

Dichlorosilanes include allyldichlorosilane, allyldichlorosilane, and allyldichlorosilane.

The titanate and zirconate couplers include tetraalkoxy titanates [Ti(OR)$_4$] and tetraalkoxy zirconates [Zr(OR)$_4$], where R is alkyl, particularly, methyl, ethyl, propyl, isopropyl, n-butyl, or t-butyl, and organic titanates [R$_n$TiR$^1_{(4-n)}$], and organic zirconates [R$_n$ZrR$^1_{(4-n)}$]. The most common alkoxy groups are methoxy, and ethoxy. An exemplary titanate coupler is titanium methacrylate triisopropoxide.

In the context of the present invention, 'nanoparticle' is defined as a particulate material having an average particle or grain size between 1 and 100 nanometers. Nanoparticles are distinguishable from particles having a particle size in the micron range, that is, greater than about 1 μm. Nanoparticles of any size, that is, ranging from about 1 nm to less than about 100 nm, may be used in the present invention. Particle size preferably ranges from about 2 nm to about 80 nm, more preferably from about 5 nm to about 50 nm, and most preferably from 5 to 30 nm.

Particle size distribution of the nanoparticles is typically narrow. A narrow particle size distribution is defined as one in which greater than 90% of the particles have a particle size in the range of 0.2-2 times the mean particle size. Preferably, greater than 95% of the particles have a particle size in this range, and more preferably greater than 99%. Another way to define a particle size distribution is in terms of the mean particle size and the width of the distribution; this method is used in the nanoparticle industry. The relationship between the width of the distribution curve at one half of the maximum value (full width-half max or FWHM) and mean particle size is used as a measure of broadness or narrowness of the distribution. For example, a distribution having a FWHM value that is greater than the mean particle size is considered relatively broad. Specifically, a narrow particle size distribution is defined in terms of FWHM as a distribution in which the FWHM of the distribution curve is equal to the difference between the mean particle size plus 40% of the mean and the mean minus 40% of the mean. (This may be simplified to two times 40% of the mean, or 80% of the mean. Using this simplified formula, the FWHM is less than or equal to 80% of the mean.) Preferably, the FWHM is less than or equal to the difference between the mean plus 30% and the mean minus 30% (60% of the mean.) More preferably, the FWHM is less than or equal to the difference between the mean plus 20% and the mean minus 20% (40% of the mean).

Nanoparticles useful in the present invention may be equiaxed, such that their shape is quasi-spherical. The long axis of a particle is defined as the longest axis through a particle, and the short axis means the shortest axis through a particle. The long axis of the nanoparticles for use in the present invention is approximately equal to the short axis, resulting in a particle shape which is quasi-spherical. In this case, for at least 90% of the nanoparticles, the ratio of the length of the short axis to that of the long axis is at least 0.1, preferably 0.4, and more preferably 0.8.

Non-spherical nanoparticles may also be used in the present invention. In this case, particle size is defined as the size of the smallest dimension of the particle. For example, nanotubes having an average particle diameter of approximately 1–<100 nm may be used, and particle size of such particles is the particle diameter, 1–<100 nm. Nanotubes have a very high aspect ratio, that is, ratio of length to diameter, typically ranging from 25 to 1,000,000. Nanoparticles that are not nanotubes or equiaxed and having an aspect ratio between 1 and 25 may also be used.

Further, the surface of a nanoparticle utilized in the present invention is typically chemically clean, that is, uncontaminated by residues from chemicals used in the synthetic process. Methods that produce nanoparticles from a gas phase, such as a gas condensation process, such as that described in U.S. Pat. Nos. 5,128,081 and 5,320,800, the contents of which are incorporated herein by reference, typically yield a clean surface. Nanoparticles made by wet chemical methods are often contaminated by residues from chemicals used in the process; these particles may be subject to a post-production clean-up process to yield a chemically clean surface. For example, many processes for the production of titanium dioxide particles involve the oxidation of $TiCl_4$ to $TiO_2$. The surface of particles produced by this process contains residual chloride ions from the $TlCl_4$. These residues may be removed by chemical cleaning processes, if desired. Nanoparticles produced by a gas condensation process are not contaminated by process residues, because no solvents, reagents or intermediates are used. Therefore, zinc oxide or titanium dioxide nanoparticles for use in the present invention are preferably prepared by a gas condensation process.

A gas condensation process for the preparation of nanoparticles typically involves evaporation of a metal precursor material from which the nanoparticles will be synthesized at gas pressures of less than one or equal to one atmosphere. The evaporated metal condenses into small particles in the gas atmosphere and the resulting nanoparticles are collected on a surface within the reactor. Any metal or metal compound capable of being volatilized may be used in this process. Exemplary metals are titanium, copper, silver, gold, platinum, and palladium. The metal nanoparticles may be further subjected to a reactive gas atmosphere to form oxides, nitrides, carbides, sulfides, fluorides, and chlorides. Exemplary metal oxide nanoparticles are those composed of aluminum oxide, antimony tin oxide, cerium oxide, copper oxide, indium oxide, indium tin oxide, iron oxide, tin oxide, titanium dioxide, yttrium oxide, zinc oxide, barium oxide, calcium oxide, chromium oxide, magnesium oxide, manganese oxide, molybdenum oxide, neodymium oxide, and strontium oxide. Metal titanate and metal silicate nanoparticles including, for example, strontium titanate, barium titanate, barium strontium titanate, and zirconium silicate may also be used. Zinc oxide nanoparticles of varying particle size, synthesized by a gas condensation process, are commercially available from Nanophase Technologies Corporation along with many of the nanoparticles listed above.

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl.

Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from nitrogen, oxygen or sulfur; or a tricyclic 13- or 14-membered aromatic or heteroaromatic ring system containing 0-3 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Alkylaryl means an alkyl residue attached to an aryl ring. Examples are benzyl and phenethyl. Heteroalkylaryl means an alkyl residue attached to a heteroaryl ring. Examples include pyridinylmethyl and pyrimidinylethyl. Arylalkyl means an aryl residue having one or more alkyl groups attached thereto. Examples are tolyl and mesityl.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Heterocycle means a cycloalkyl or aryl residue in which one to two of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran.

Substituted refers to residues, including, but not limited to, alkyl, alkylaryl, aryl, arylalkyl, and heteroaryl, wherein up to three H atoms of the residue are replaced with lower alkyl, substituted alkyl, substituted alkynyl, haloalkyl, alkoxy, carbonyl, carboxy, carboxalkoxy, carboxamido, acyloxy, amidino, nitro, halogen, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy.

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

EXAMPLES

Example 1

Heterogenous Distribution of ZnO Nanoparticles in LDPE Matrix

Experimental: ZnO nanoparticles were donated by Nanophase Technologies Corporation, and the average particle size was determined to be approximately 50 nm from TEM observation. For uniform distribution of filler particles, the nanoparticles were melt-mixed with low density polyethylene (LDPE; DOW 681I) pellets using a torque rheometer (Haake batch mixer system 90). The resulting composite was then examined with field-emission scanning electron microscope (FESEM, JEOL JSM-6335F), and fillers were observed to be well dispersed and distributed uniformly in the polymer matrix. Non-uniform distribution of the filler in the matrix was achieved by ball milling the nanoparticles with micron-size LDPE powders obtained from Ultra Chemical Inc. The mixture of particles was ball milled at room temperature for 24 hours so that ZnO nanoparticles were embedded in the soft surface of the LDPE particles. Neither the LDPE powders nor the ZnO nanoparticles were observed to break into smaller pieces during the ball milling. Together they formed large agglomerates approximately 1 mm in diameter composed of many LDPE powder particles coated with ZnO nanoparticles. The mixtures were then hot pressed at approximately 170° C. to form a disc-shaped specimen with a diameter of 7.5 cm and a thickness of approximately 0.03 cm. The microstructure of the composites with inhomogeneous filler distribution was examined with FESEM, and the electrical resistivity was measured under an applied electrical field of 10 kV/cm over the thickness of the disc specimens with a guard ring to remove any effect of surface conduction.

Results: The specimens were broken in liquid nitrogen and their fracture surfaces were examined by FESEM. The homogeneous and inhomogeneous distributions of filler particles were examined. The polymer matrix was mechanically stronger than the filler aggregates and the composite broke primarily through the filler aggregates. Therefore, filler nanoparticles were exposed on the fracture surface of the composites. Aggregated particle lumps appear in the micrographs, while the individual particles are well separated from one another. ZnO nanoparticles were embedded in the surfaces of the LDPE particles during the ball milling procedure, and stay aggregated at the boundaries between LDPE particles during the compression molding at 150° C. The LDPE particles, however, melt and extrude into the inter-particle spaces resulting in high filler concentration composite layers between LDPE core regions where particle concentrations remain low. As this process progresses under the hot press, the resulting structure develops into an inhomogeneous mixture of regions with high and low filler concentrations. At a low filler concentration, the particles do not completely cover the surfaces of the LDPE particles and the LDPE cores join to form a continuous matrix phase leaving ZnO nanoparticles scattered in lumps. As the filler concentration increases, the high volume fraction regions form many paths extending throughout the entire specimen.

Figure 1:
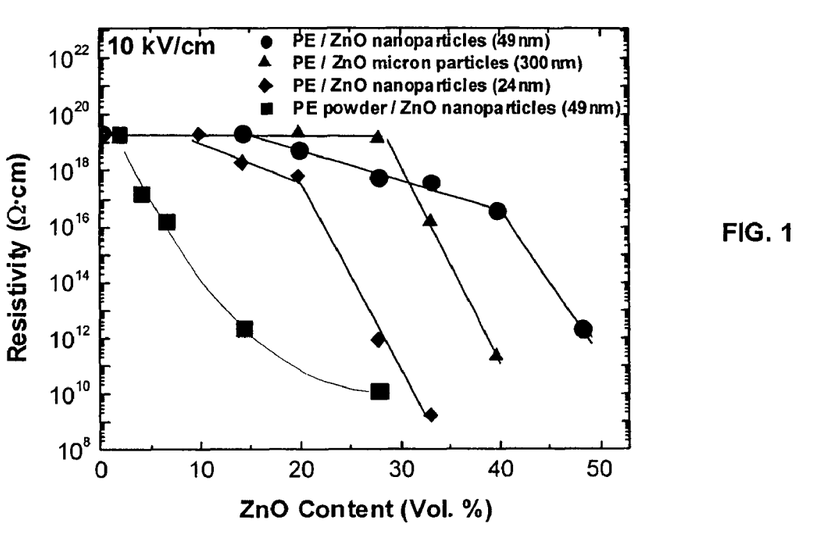
FIG. 1 shows electrical resistivities of LDPE/ZnO composites as a function of ZnO content under an applied field strength of 10 kV/cm. Data for samples with homogeneous and heterogeneous filler distribution are shown.

The electrical resistivities of disc specimens having different filler concentrations were measured and are shown in FIG. 1. For comparison, the resistivities of specimens with homogeneous micron-size and nano-size filler distributions, are also shown. The percolation limit decreased as the particle size decreased and even more so as a result of inhomogeneous filler distribution. The slope of the resistivity curve as a function of filler content for the samples with inhomogeneous distribution was close to the slope for composites with homogeneously distributed micron particles. On the other hand, the resistivities for composites with homogeneously distributed nanoparticles exhibited slow decrease in resistivity above the percolation limit but fast decrease followed as the filler concentration increases further. It is thought that the conduction mechanism is different for the two sets of samples. In the composites with homogeneous distribution of filler particles, electrons can tunnel between particles through thin layers of the insulating matrix and this tunneling occurs throughout the entire specimen. This results in a lower slope. In the composites with inhomogeneous filler distributions, electrons are transported between adjacent touching particles or tunnel over very short inter-particle distances. This mechanism increases the conductivity, but the conduction mainly occurs along the network of highly filled areas between the relatively pure LDPE grains. Therefore, the conduction paths for inhomogeneous composites are more conducting, but limited to smaller spatially limited regions compared to the conduction paths in homogeneously distributed composites for a given concentration. However, the net resistivity of the composite is determined by the combination of these two competing effects. At high enough filler concentration, all the samples exhibit the same sharp drop in resistivity with filler concentration which is indicative of a conduction mechanism through the touching particles.

Figure 2:
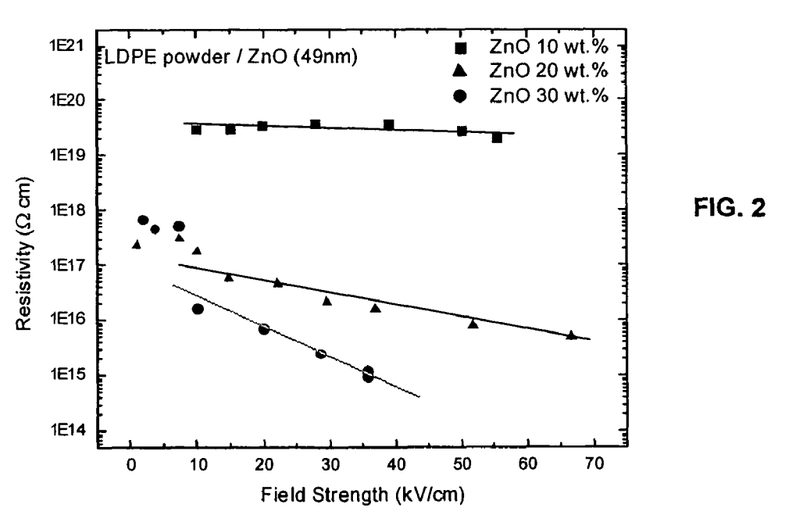
FIG. 2 shows electrical resistivities of ZnO/LDPE inhomogeneous composites as function of applied field strength.

FIG. 2 exhibits the nonlinear electrical resistivity of the inhomogeneous nanocomposites as a function of applied electric field strength. The resistivity of the percolated composites decreased as the applied field strength increased. The slope of each curve indicates the degree of nonlinearity in the current-voltage (I-V) relationship. The resistivity of pure LDPE did not show any noticeable change in the field strength range shown in FIG. 2. The nonlinearity in this field strength range is inherited from the ZnO nanoparticles and is shown to increase with ZnO filler concentration. The increase of nonlinearity can be understood from the increased local field around the ZnO nanoparticles. Electric field lines in the composite are distorted by the presence of nanoparticles with a conductivity much higher than that of the insulating matrix. The equipotential lines are pushed away from the particles and the local field around the surface of nanoparticles becomes greater than the average applied field strength due to this field-line distortion. This increased local field effect becomes stronger as the filler particle distribution becomes more inhomogeneous. The strongest local field is felt for particles sitting at the interface between high and low filler concentration regions. The nonlinearity of ZnO is greater under a higher electric field and the composite with inhomogeneous filler distribution exhibits greater nonlinearity due to the increased local field (compared with the average applied field) inside the composite.

Conclusions: It has been shown that the percolation limit for the electrical resistivity of polymer nanocomposites can be controlled by the distribution state of the filler particles as well as the size of the fillers. The mechanism of electrical conduction through the composite also changes with the filler particle distribution. These changes in electrical resistivity suggest the ability to design nanocomposites with tailored electrical properties via the control of microstructure as Well as the size of the filler particles. Better control of the filler particle distribution and, hence, the microstructure is expected by using fillers and matrix powders of various sizes.

Nonlinear electrical resistivities of LDPE matrix nanocomposites containing ZnO nanoparticle fillers were also affected by the spatial distribution of these nanoparticles inside the composite. Due to the large differences in resistivity between filler and matrix, the electric field distribution around the nanoparticles changes yielding higher local field strengths than the average field strength applied over the thickness of the specimen.

Example 2

Dielectric Properties of ZnO/LDPE Nanocomposites

Experimental: ZnO/LDPE nanocomposites were produced by melt mixing commercial grade DOW 681I LDPE and 49 nm ZnO nanoparticles in a Haake batch mixer. ZnO nanoparticles were obtained from Nanophase Technologies Corporation. To avoid any thermal degradation of the polymer matrix, the mixing time was set to 10 to 13 minutes at 200° C. The specimen was then hot pressed into a disc shape with a diameter of 6.35 cm for the measurements of permittivity.

In order to realize the property changes resulting from the addition of nanoscale fillers, they must be dispersed well within the matrix. To observe dispersion, the composites were cooled below their glass transition temperature and fractured. The fracture surface was examined with field emission scanning electron microscope (JEOL JSM-6335F) operated at 5 kV. SEM images showed that the particles were dispersed quite well.

The permittivity of the nanocomposite was measured using a Quadtech 1689 LCR meter and a home-made electrode fixture with grounded guard ring to minimize the edge effect during the measurements of capacitance.

Results and Discussion: The permittivity of the nanocomposites was measured to be roughly proportional to the volume content of ZnO particles in the composites, following the relationship $$\varepsilon = \frac{v_m \varepsilon_m \left(\frac{2}{3} + \frac{\varepsilon_d}{3\varepsilon_m}\right) + v_d \varepsilon_d}{v_m \left(\frac{2}{3} + \frac{\varepsilon_d}{3\varepsilon_m}\right) + v_d}.$$

Figure 3:
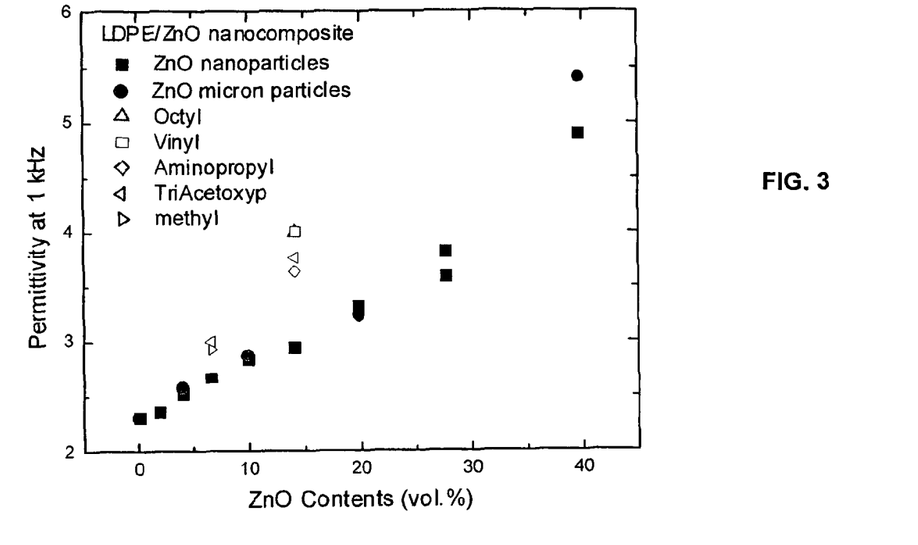
FIG. 3 shows permittivity of nanocomposites measured at 1 kHz.

This relationship was derived by Maxwell for a mixture of spherical particles with dielectric constant $\varepsilon_d$ dispersed in a matrix with lower dielectric constant, $\varepsilon_m$, with volume fractions of $v_d$ and $v_m$, respectively. The trend shown in FIG. 3 is the same for both nanoparticle and micron-particle fillers in spite of the much higher specific surface area of the nanoparticles. Therefore, the interfaces between ZnO filler and LDPE matrix do not make apparent contribution to the permittivity of the composite.

The high surface area of the nanoparticles can be used to introduce extra organic material into the composite by coating the nanoparticle surfaces with silane coupling agents. When such a coating is on the surface of the particles, the permittivity can be increased depending on the dielectric properties of the coating agent. It is demonstrated with composites with filler concentrations of 14 vol. % with various coupling agents as shown in FIG. 3.

The temperature dependences of the permittivity of the composites were also measured by placing the electrode and specimen in a silicone oil bath at elevated temperatures. Pure polyethylene showed a slight decrease of permittivity as temperature increased. For the composites, the decrease of permittivity at higher temperatures was compensated for by the increasing permittivity of the ZnO filler particles with temperature. At about 20 wt. % ZnO, the permittivity remained essentially constant over the temperature range tested, while for the 40 wt. % ZnO samples a measurable increase was observed at higher temperatures. The composites with the higher concentration of ZnO measured (80 wt. %) exhibited a strong increase of permittivity with temperature. The same behavior of increasing permittivity with temperature was observed with LDPE/ZnO micron particle composites.

Conclusions: The permittivity of the ZnO/LDPE nanocomposites investigated was not affected by the high surface area or small particle size of the nanoparticles used as fillers. The interface between ZnO and LDPE does not appear to contribute to the dielectric properties. On the other hand, the high surface area of the nanoparticle fillers can be used to introduce surface coating agents with higher permittivity into the composites. The resistivity decreased exponentially with increasing ZnO volume content of the homogeneously distributed nanoparticles, but at a rate considerably less than expected for a sharp onset of percolation. Permittivity increased with increasing ZnO volume content. At lower concentrations, the electrical conduction seems to be due to the tunneling between ZnO filler particles. At sufficiently high concentrations, direct conduction from particle to particle ensues.

Example 3

Breakdown Strength of TiO$_2$/LDPE Nanocomposites

Experimental Approach: The matrix used in this study was low-density polyethylene (LDPE) DOW 681I. The basic characteristics of LDPE 681I are: density 0.922 g/cc and melt index 1.2 g/10 min. Both micron-scale (1-2 µm) from Aldrich and nano-size (23 nm average diameter) TiO$_2$ from Nanophase Technologies Corporation were used as fillers. Five weight percent TiO$_2$ particles were mixed into LDPE at 130° C. in a melt mixer. Films with a thickness of 10-40 µm were obtained using compression molding at 160° C. under a pressure of about 14 MPa. The temperature of the film was decreased to 50-60° C. slowly in the mold under pressure before it was removed from the mold and air-cooled to room temperature. Each sample was then kept in a desiccator for at least one day before the breakdown strength was measured in case residual internal stress influences the experimental results. Unfilled pure LDPE went through exactly the same process in order to reduce the effects of processing on the results. TiO$_2$ particles with three different surface conditions were used: as received, vacuum dried at 195° C. for 24 hrs, and surface modified.

The surface modification was carried out by toluene reflux. Both N-(2-aminoethyl) 3-aminopropyl-trimethoxysilane (AEAPS) and decyltrichlorosilane (Decyl) from Gelest. Inc. were used as coupling agents. Toluene was first dried by CaH$_2$ powder in N$_2$ atmosphere and purified by distillation. Ten grams of dried nano-TiO$_2$ were dispersed by sonication at 70% power for 5 minutes in dried toluene. Coupling agent was slowly added to the nano-TiO$_2$/toluene mixture. Then the mixture was put into oil bath at 135° C. and magnetically stirred for 24 hrs. The resulting slurry was centrifuged at 6,000 rpm for 10 minutes, and then washed twice with toluene. Finally, the modified particles were dried in a vacuum oven at about 30° C. for 24 hrs.

A sphere-plane setup was used for the breakdown measurements. The diameter of the sphere was ¼ inch (0.635 cm). The spherical electrode was connected to a high potential, while the plane electrode was connected to ground potential. The test was performed at room temperature using a stepwise voltage. Each voltage step was 100 V and was maintained for approximately 1 second before the high voltage electrode was grounded and the next higher voltage was applied. The process proceeded until breakdown occurred showing a sharp current increase. Breakdown strength is defined as the electrical voltage at breakdown divided by the sample thickness. Water absorption was checked by immersing samples into water at 50° C. and measuring their weight change.

A Weibull distribution was used to analyze the breakdown data. This distribution has been found to be the most appropriate for breakdown analyses. The cumulative probability of the electrical failure takes the form of $$P(E) = 1 - \exp\left[-\left(\frac{E}{E_0}\right)^\beta\right]$$

w***here $\beta$ is a shape parameter, and $E_0$ is a scale parameter that represents the breakdown strength at the cumulative failure probability of 0.632. We used $E_0$ to show the significance in the differences between several sets of breakdown data.

Results: Breakdown strength is defined as the electric field intensity that causes an "insulator-to-conductor" transition in a material and is accompanied by a sharp increase in current. Weibull distribution of the Breakdown strength of pure LDPE samples and of the samples containing as-received nano-TiO$_2$, dried nano-TiO$_2$ or dried micro-TiO$_2$ particles was plotted. The difference in $E_0$ obtained from the linear regression of the Weibull plot for these four kinds of samples is clearly shown in Table 1.

TABLE 1

Comparison Of The Breakdown Strength And The Scattering Of Data

| Sample | Average BD (MV/cm) | Standard Error (MV/cm) | $E_0$ (MV/cm) | $\beta$ | Data amount |
|---|---|---|---|---|---|
| Unfilled LDPE | 3.37 | 1.14 | 3.78 | 3.53 | 22 |
| LDPE/as-received nanoscale TiO$_2$ | 2.10 | 0.50 | 2.30 | 5.12 | 30 |
| LDPE/dried Micron-TiO$_2$ | 2.41 | 0.64 | 2.58 | 4.51 | 34 |
| LDPE/dried nanoscale TiO$_2$ | 3.12 | 1.13 | 3.51 | 3.03 | 23 |
| LDPE/AEAPS-coated nanoscale TiO$_2$ | 2.75 | 0.78 | 3.13 | 3.31 | 24 |

Note:
BD—Breakdown strength

With the incorporation of 5 wt % as-received nanoscale TiO$_2$, a 40% decrease in the breakdown strength was observed as compared to pure LDPE which has an $E_0$ of 3.78 MV/cm. A 95% confidence interval (not shown here) indicates that this difference is significant. The breakdown strength, $E_0$, of dried nanoscale TiO$_2$/LDEP is 3.51 MV/cm, close to that of pure LDPE. Due to a partial overlap of the 95% confidence bounds, the breakdown strength of the samples containing dried nanoscale TiO$_2$ is not significantly different from that of unfilled LDPE. However, the difference in breakdown strength between the as-received and dried nanoscale titania/LDPE composites is significant indicating that drying the nanoparticle surface has a significant effect on the breakdown strength.

This conclusion was further verified by comparing the $E_0$ of the samples filled by the as-received nanoscale TiO$_2$ and $E_0$ of those filled by the dried micro-TiO$_2$. The latter show higher breakdown strength although the average size of the additive particles in the latter is 40~90 times larger than that of the additive particles in the former. This indicates that the water absorption on the surface of the nanofillers has a much larger effect on breakdown strength than particle size.

The surface of oxide nanoparticles is always covered by hydroxyl groups (M—OH) and physically adsorbed water hydrogen bonded to the surface hydroxyls. Thermogravimetry (TGA) was used to investigate the oxide surface before and after the drying treatment. It was found that the drying process at 195° C. efficiently removed the surface water as shown by the lack of weight loss below 300° C. after drying. After drying there was weight loss above 300° C. indicating that there were still hydroxyl groups on the surface. If we assume the difference in weight loss at 300° C. is due to the total removal of the physically adsorbed water layer on the nanoparticle surface, then the surface water accounts for about 0.93 wt % in as-received nanoscale $TiO_2$. When 5 wt % as-received nanoparticles were put into the polymer matrix, the overall water content goes down to as low as 0.047 wt %. It is worthwhile to pursue how such a small amount of water has such a significant effect on the breakdown strength. The possible reasons are presented. First, the conductive water layer on the nanoscale $TiO_2$ surface causes conductive power loss. This may result in an increase of temperature locally, causing burning and decomposition of the surrounding polymers. Thus, thermal breakdown occurs. In addition, the conductive water layer may further increase the local field distortion by changing the space charge distribution. This could lead to breakdown across the interface. In addition to removing water, drying the interface leads to a better interface because the surface is less hydrophilic as observed by the ease with which the dried particles float on water while the wet ones sink. Finally, polymer morphology changes caused by the nanoparticle fillers may contribute to the increase of the breakdown strength of dried nanoscale $TiO_2$ filled samples. It is possible that nanoscale $TiO_2$ acts as a nucleation site and promotes heterogeneous crystal nucleation of LDPE. The surface tension of the nucleation centers is one of the factors determining lamellar thickness. The existence of the water causes the different surface energy, thus different lamellar thickness, and accordingly that may influence the breakdown strength. More work needs to be done to fully understand the mechanism.

Figure 4:
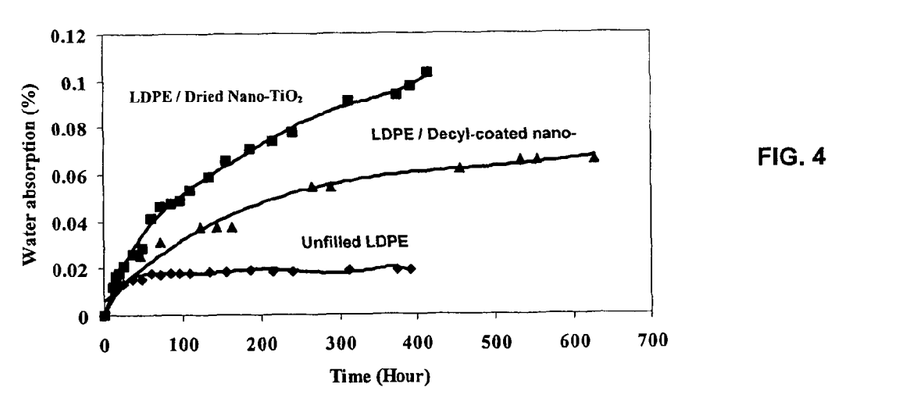
FIG. 4 compares water absorption of silane-treated and dried $TiO_2$ nanoparticles in an LDPE matrix to untreated particles.

FIG. 4 shows water absorption of unfilled LDPE, dried nanoscale $TiO_2$ filled LDPE and Decyl-coated nanoscale $TiO_2$ filled LDPE. Water gets saturated in pure LDPE after just a couple of days, but for dried nanoscale $TiO_2$ filled LDPE, the water absorption continued even after 17 days. This can be easily understood. Evidently, water absorption was enhanced by putting quite a few hydrophilic nanoparticles into the hydrophobic matrix. Because of the possibility that water could reabsorb onto the particles with time and decrease the breakdown strength, Decyl, which is hydrophobic, was used to coat nanoscale $TiO_2$ surface to increase its water resistance. It can be seen in FIG. 4 that the water absorption decreased as a result of the surface modification. $E_0$ of unfilled PE was compared to that of as-received nanoscale $TiO_2$ filled LDPE and AEAPS-coated nanoscale $TiO_2$ filled PE.

Although after surface modification, $E_0$ is still lower than unfilled LDPE, it is about 40% higher than uncoated nanoscale $TiO_2$ filled PE. It again indicates that the surface chemistry has an important influence on $E_0$. It is quite possibly due to either an increase in electron scattering or a change in the space charge distribution in the samples because of the existence of polar groups in AEAPS. The result is promising. We can expect that by choosing a very "good" coupling agent, $E_0$ obtained can be even higher than that of pure LDPE.

To fully characterize the breakdown strength, not only $E_0$, but also the spread of the data has to be considered. The shape parameter β determined by the linear regression method represents the spread of breakdown strength: β tends to decrease with an increase in scatter. Our results showed the same trend by comparing β with the standard deviation shown in Table 1. Note that except for the dried nanoscale $TiO_2$ filled samples, the data for composites filled with as-received nanoscale $TiO_2$, the dried micron-$TiO_2$, or AEAPS-coated nanoscale $TiO_2$ show much lower scatter than that of unfilled LDPE.

In summary, surface chemistry such as the existence of surface water and surface silane had a much more significant influence than the size of the nanoparticles on the breakdown strength. By using the dried nanoscale $TiO_2$, $E_0$, the breakdown strength at the cumulative failure probability of 63.2% was increased by 50% compared with the samples filled by the as-received nanoscale $TiO_2$, close to that of unfilled LDPE. AEAPS-coated nanoscale $TiO_2$ filled samples showed a 40% increase in $E_0$ compared with that of uncoated nanoscale $TiO_2$ filled samples.

The invention claimed is:

1. A field grading material comprising:
a polymer matrix, said polymer matrix having two or more polymer phases; and
a field grading effective amount of a semiconducting nanoparticle filler, wherein said filler is heterogeneously distributed in said polymer matrix such that said semiconducting nanoparticle filler is well dispersed in at least part of one of said polymer phases; and wherein said semiconducting nanoparticle filler comprises less than 40% by volume of said field grading material.

2. A field grading material according to claim 1, wherein said nanoparticle filler is selected from semiconducting materials having an energy bandgap ranging from 0 eV to 5 eV and dielectric materials having a bulk dielectric constant at infinitely high frequencies of at least 5.

3. A field grading material according to claim 1, wherein said nanoparticle filler comprises a semiconducting material.

4. A field grading material according to claim 1, wherein said nanoparticle filler is selected from ZnO, SnO, InO, CeO, $TiO_2$, SiC, $BaTiO_3$, $Al_2O_3$, $SiO_2$ and mixtures thereof.

5. A field grading material according to claim 1, wherein said polymeric matrix comprises a rubber, a thermoplastic polymer, a thermosetting polymer, or thermoplastic elastomer.

6. A field grading material according to claim 5, wherein said polymeric matrix comprises at least one of a polyolefin rubber, a thermoplastic polyolefin elastomer, a silicone rubber, and a crystalline thermoplastic polymer.

7. A field grading material according to claim 5, wherein said polymeric matrix comprises a polymer selected from EPDM and polyethylene.

8. A field grading material according to claim 1, wherein said polymeric matrix comprises a polymer blend of immiscible polymers.

9. A field grading material according to claim 8, wherein said polymer blend is selected from polyethylene/EPDM, LDPE/HDPE, and maleic anhydride-modified EPDM/EPDM.

10. A field grading material according to claim 1, wherein said nanoparticles have a particle size from 2 to 80 nm.

11. A field grading material according to claim 1, wherein said nanoparticle filler comprises less than 30% by volume of the field grading material.

12. A field grading material according to claim 1, wherein a surface of said nanoparticle filler is modified by treatment with an organosilane or organotitanate compound and the organosilane compound comprises an organic group selected from alkyl, alkylamino, amino and carboxy.

13. A field grading material according to claim 12, wherein said organic group is selected from methyl, decyl, octyl, vinyl, aminopropyl and acetoxy.

14. A field grading material comprising a semiconducting nanoparticle filler heterogeneously distributed in a polymeric matrix, wherein a surface of said semiconducting nanoparticle filler is modified by treatment with an organosilane or organotitanate compound and said organosilane compound comprises an organic group selected from alkyl, alkylamino, amino and carboxy.

15. A field grading material according to claim 14, wherein said organic group is selected from methyl, decyl, octyl, vinyl, aminopropyl, and acetoxy.

16. A method for reducing electric field stress at a joint or termination of an electric cable, said method comprising introducing in said joint or termination a field grading material according to claim 1.

* * * * *